US006966330B2

(12) United States Patent
Frohwein

(10) Patent No.: US 6,966,330 B2
(45) Date of Patent: Nov. 22, 2005

(54) WELDRING WITH LOCKING ARRANGEMENT FOR VALVE ASSEMBLY

(75) Inventor: Axel Frohwein, Treuchtlingen (DE)

(73) Assignee: Alfmeier Corporation, Greenville, SC (US)

( * ) Notice: Subject to any disclaimer, the term of this patent is extended or adjusted under 35 U.S.C. 154(b) by 33 days.

(21) Appl. No.: 10/651,077

(22) Filed: Aug. 27, 2003

(65) Prior Publication Data
US 2005/0045227 A1 Mar. 3, 2005

(51) Int. Cl.$^7$ ............................................. F16K 24/04
(52) U.S. Cl. ..................................................... 137/202
(58) Field of Search .................................. 137/43, 202

(56) References Cited

U.S. PATENT DOCUMENTS

| | | |
|---|---|---|
| 4,212,488 A | 7/1980 | Cook |
| 4,214,767 A | 7/1980 | Davies, III |
| 4,569,637 A | 2/1986 | Tuckey |
| 4,905,726 A | 3/1990 | Kasugai et al. |
| 5,139,043 A | 8/1992 | Hyde et al. |
| 5,148,792 A | 9/1992 | Tuckey |
| 5,402,818 A | 4/1995 | Kasugai et al. |
| 5,404,907 A | 4/1995 | Benjey et al. |
| 5,441,781 A | 8/1995 | Uchida et al. |
| 5,443,874 A | 8/1995 | Tachi et al. |
| 5,449,018 A | 9/1995 | Harris |
| 5,449,029 A | 9/1995 | Harris |
| 5,518,018 A | 5/1996 | Roetker |
| 5,529,086 A | 6/1996 | Kasugai et al. |
| 5,535,772 A | 7/1996 | Roetker et al. |
| 5,566,705 A | 10/1996 | Harris |
| 5,577,526 A | 11/1996 | Kasugai et al. |
| 5,582,198 A | 12/1996 | Nagino et al. |
| 5,589,241 A | 12/1996 | Stiles et al. |
| 5,598,870 A | 2/1997 | Nagino |
| 5,598,872 A | 2/1997 | Kasugai et al. |
| 5,621,176 A | 4/1997 | Nagano et al. |
| 5,632,296 A | 5/1997 | Kasugai et al. |
| 5,666,989 A | 9/1997 | Roetker |
| 5,687,756 A | 11/1997 | VanNatta et al. |
| 5,687,778 A | 11/1997 | Harris |
| 5,694,968 A | 12/1997 | Devall et al. |
| 5,749,347 A * | 5/1998 | Torii et al. ................... 137/202 |
| 5,789,679 A | 8/1998 | Koshimizu et al. |
| 5,803,131 A | 9/1998 | Iwasa et al. |
| 5,944,044 A | 8/1999 | King et al. |
| 5,960,819 A * | 10/1999 | Weissinger et al. ........... 137/43 |

(Continued)

FOREIGN PATENT DOCUMENTS

EP        0742096 A2     11/1996

(Continued)

OTHER PUBLICATIONS

English Language Abstract of Japanese Patent Publication No. 200304204, published Feb. 13, 2003, entitled "*Mounting Structure for Liquid Shut-Off Valve Device*".

Primary Examiner—Gerald A. Michalsky
(74) Attorney, Agent, or Firm—Dority & Manning, P.A.

(57) ABSTRACT

An apparatus for attachment in an aperture of a fuel tank includes a cap member, a mounting portion, and a valve housing. Two or more of the cap member, the mounting portion, and the valve housing include a system of clips and catches or a system of helical threads, which attach the components together. The mounting portion may include a multi-layer laminate to reduce a fuel vapor permeation from the fuel tank. The cap member, the mounting portion, and the valve housing are attached by various steps and methods according to the invention.

12 Claims, 6 Drawing Sheets

U.S. PATENT DOCUMENTS

| | | |
|---|---|---|
| 5,975,116 A | 11/1999 | Rosas et al. |
| 6,035,884 A | 3/2000 | King et al. |
| 6,037,062 A | 3/2000 | Tsutsumi et al. |
| 6,058,963 A | 5/2000 | Enge et al. |
| 6,170,510 B1 | 1/2001 | King et al. |
| 6,189,567 B1 | 2/2001 | Foltz |
| 6,240,950 B1 | 6/2001 | Harris |
| 6,286,539 B1 * | 9/2001 | Nishi et al. ............... 137/202 |
| 6,408,867 B2 * | 6/2002 | Aoki et al. ............... 137/202 |
| 6,422,261 B1 * | 7/2002 | DeCapua et al. .......... 137/202 |
| 6,431,200 B2 | 8/2002 | Brock et al. |
| 6,508,263 B1 | 1/2003 | Jahnke et al. |
| 6,543,426 B1 | 4/2003 | Schwochert |
| 6,679,282 B2 * | 1/2004 | Aoki et al. ............... 137/202 |
| 2003/0015235 A1 | 1/2003 | Spink |
| 2003/0015526 A1 | 1/2003 | Nakaya et al. |
| 2003/0066558 A1 | 4/2003 | Muto et al. |
| 2003/0089405 A1 | 5/2003 | Mills |
| 2003/0094763 A1 | 5/2003 | Benjey |
| 2003/0111111 A1 | 6/2003 | Zorine |
| 2003/0198768 A1 | 10/2003 | Delbarre |
| 2004/0124567 A1 * | 7/2004 | Stangier ............... 264/523 |
| 2004/0151850 A1 * | 8/2004 | Frohwein ............... 428/34.1 |

FOREIGN PATENT DOCUMENTS

| | | |
|---|---|---|
| EP | 0930190 A2 | 7/1999 |
| EP | 1084889 B1 | 8/2002 |
| EP | 0941884 B1 | 2/2003 |
| EP | 1291223 A2 | 3/2003 |
| JP | 200304204 | 2/2003 |
| WO | WO 03008224 A1 | 1/2003 |

* cited by examiner

WELDRING WITH LOCKING ARRANGEMENT FOR VALVE ASSEMBLY

BACKGROUND OF INVENTION

In the field of automotive fuel systems, fuel tanks are made typically from a weldable polymeric material such as a high-density polyethylene (HDPE). A polymeric fuel tank is resistant to corrosion and can be efficiently manufactured, such as by blow molding, which permits flexibility in fuel tank design. Further, since the polymeric fuel tank is lightweight, the vehicle in which it is installed is more fuel efficient and economical to operate.

Relatively soft polymeric materials that lend themselves to efficient fuel tank manufacturing typically are not suitable for making quality fuel system components, such as vent valves. For instance, a vent valve made largely or entirely out of the same material as the fuel tank can be damaged using a conventional method such as hot plate welding to weld a port for the vent valve to the polymeric fuel tank. On the other hand, harder materials such as nylon with higher-melting temperatures suitable for use in the vent valve are difficult if not impossible to weld to the polymeric fuel tank. Nylon and HDPE, for example, simply do not weld together very well due to their different melting temperatures and other properties.

Various mounting assemblies have been proposed to overcome problems associated with mounting fuel system components such as the nylon vent valve in a wall of the polymeric fuel tank. However, due to the incompatibility of tank and fuel system component materials, valve/tank interfaces continue to suffer from fuel vapor permeation problems permitting hydrocarbons to escape from the fuel tank. A vent valve structure is needed that can be efficiently produced and securely attached to the polymeric fuel tank to reduce fuel vapor permeation from the fuel tank.

BRIEF SUMMARY OF INVENTION

The present invention includes a weldable fuel tank assembly with a permeation barrier to reduce fuel vapor permeation from a fuel tank and methods of attaching such assemblies to fuel tanks. The component parts of the invention are simple, reliable, and economical to manufacture, assemble, and use. Other advantages of the invention will be apparent from the following description and the attached drawings, or can be learned through practice of the invention.

According to one aspect of the invention, an apparatus for attachment in an aperture of a fuel tank has a cap member having a catch, a vapor-inlet opening, a vapor-outlet opening, and a passageway interconnecting the vapor-inlet opening and the vapor-outlet opening. The apparatus further includes a mounting portion defining a weldfoot and a clip. The weldfoot is weldable to the fuel tank, and the clip is engageable with the catch to attach the cap member to the mounting portion. Additionally, the apparatus has a valve housing, which is attachable to the cap member. The valve housing is inserted within an interior of the fuel tank and communicates fuel-vapor between the interior of the fuel tank and the vapor-inlet opening of the cap member. In a further aspect of the invention, the catch and the clip are interchangeable and/or intermixed on the cap member and the weldfoot.

A method for attaching a valve assembly to a fuel tank wall is provided in a further aspect of the invention. The method includes the steps of providing a valve housing defining a first annular ring thereon; providing a cap member defining a second annular ring thereon and a plurality of catches, the annular rings complementary to each other; providing a mounting portion having a weldfoot and a plurality of clips depending from proximate the weldfoot; connecting the valve housing and the cap member together; mating respective catches and clips to connect the cap member and mounting portion together; inserting at least a portion of the valve housing through an aperture in the fuel tank wall such that the valve housing is in fuel-vapor communication with an interior of the fuel tank; and attaching the weldfoot to the fuel tank wall about the aperture.

According to another aspect of the invention, an apparatus for mounting a valve assembly in an aperture of a fuel tank includes a cap member having a plurality of catches and a nozzle, the nozzle defining a vapor-inlet opening, a vapor-outlet opening and a passageway therein. A mounting portion of the apparatus in this aspect defines a weldfoot and a plurality of spaced-apart clips, the weldfoot having a multilayer laminate to reduce fuel-vapor permeation from the fuel tank. The weldfoot is also weldable to a surface of the fuel tank.

The clips in this aspect clip to a respective one of the catches and are formed to flex relative to the weldfoot, respective portions of each of the clips interposed between each of the catches and the valve housing. The valve housing is attachable to the cap member and at least partially disposed within an interior of the fuel tank. Similar to other embodiments described herein, the valve housing is in fuel-vapor communication with the interior of the fuel tank and the vapor-inlet opening of the cap member.

According to a further aspect of the invention, an apparatus for mounting a valve assembly in an aperture of a fuel tank is provided with a cap member having a first helical thread defined thereon and a nozzle, the nozzle defining a vapor-inlet opening, a vapor-outlet opening and a passageway therein. A mounting portion in this aspect defines a weldfoot and a second helical thread defined thereon. The weldfoot has a multilayer laminate to reduce a fuel-vapor permeation from the fuel tank. The multilayer laminate may be welded or co-extruded with the weldfoot. The second helical thread attaches with the first helical thread to attach the cap member and the mounting portion together.

According to another aspect of the invention, a method for attaching a valve assembly to a fuel tank wall defining an aperture therethrough includes the steps of providing a valve housing defining a first helical thread thereon; providing a cap member defining a second helical thread thereon, the first and the second helical threads complementary to each other to mate the cap member to the valve housing; providing a mounting portion having a weldfoot and a third helical thread thereon depending from proximate the weldfoot; rotatably attaching the cap member to the mounting portion via the second and third helical threads; mating the valve housing to the attached cap member and mounting portion via the first and second helical threads; inserting at least a portion of the valve housing through the aperture in the fuel tank wall such that the valve housing is in fuel vapor communication with an interior of the fuel tank; and attaching the weldfoot to the fuel tank wall about the aperture.

Additional features and advantages of the invention will become apparent to those skilled in the art upon consideration of the attached drawings in conjunction with the following detailed description of the drawings, which exemplifies the best mode of carrying out the invention as presently perceived, or can be learned through practice of the invention.

BRIEF DESCRIPTION OF THE DRAWINGS

The above and other aspects and advantages of the present invention are apparent from the detailed description below and in combination with the drawings in which.

DETAILED DESCRIPTION OF THE DRAWINGS

Figure 1:
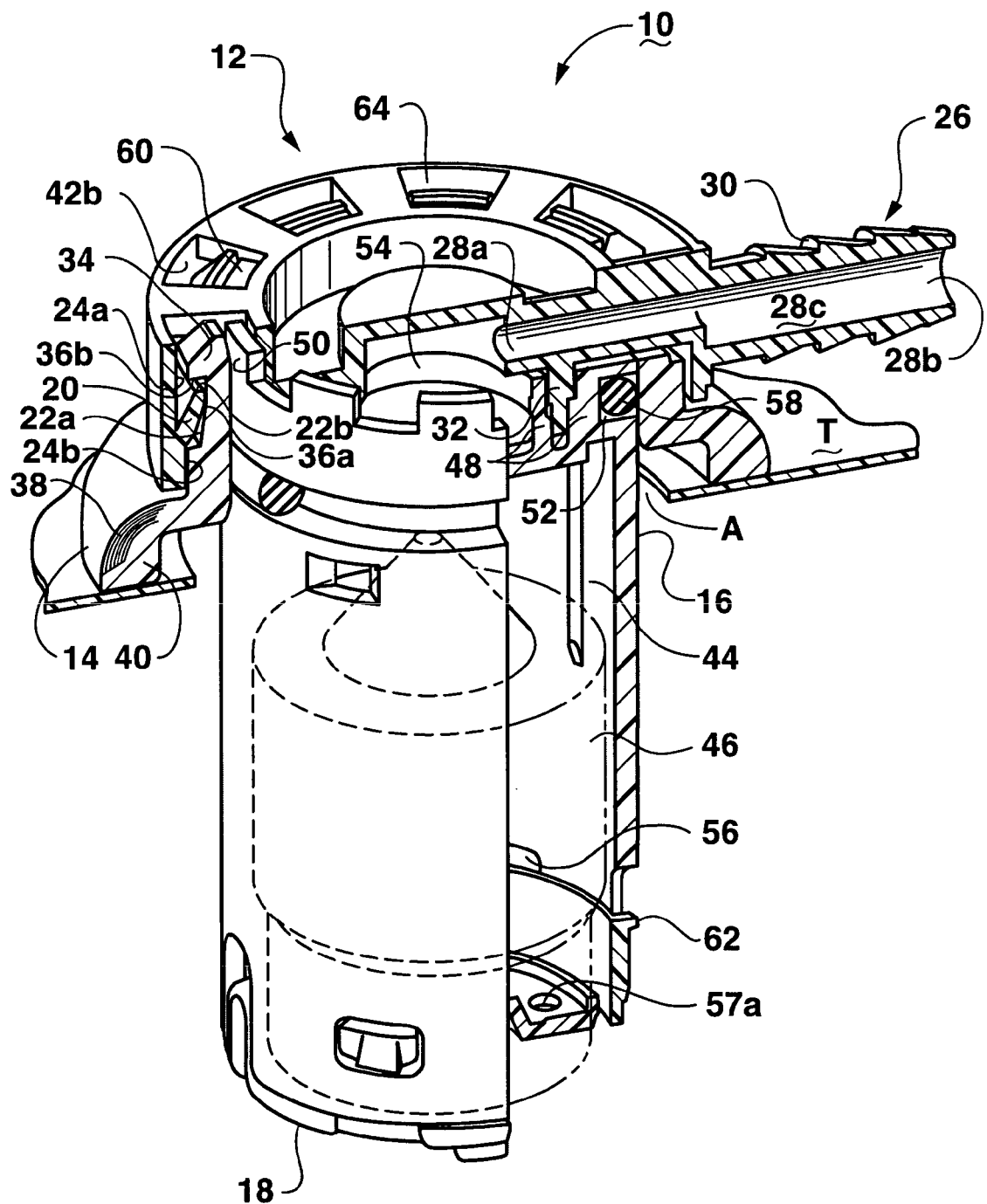
FIG. 1 is a top perspective, sectional view of an assembly in accordance with an aspect of the present invention.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

As broadly embodied in FIGS. 1–4, an apparatus such as a valve assembly for a fuel tank T is provided. According to this embodiment of the invention, the apparatus, generally designated by the number 10, is attached about an aperture A of the fuel tank T. The fuel tank T is made of a weldable material such as high-density polyethelene (HDPE). Portions of the apparatus 10 are also made of various types of HDPE including but not limited to HDPE, conductive HDPE, sulfonated HDPE, and various combinations of these HDPE materials. Sulfonated HDPE, for instance, is available from Sulfo Technologies of Troy, Mich., where it is derived from a sulfonation process. For example, an HDPE part such as an injection molded mounting portion 14 (described in greater detail below) is treated with an acid such as sulfamic acid. Specifically, either an inner or outer surface of the mounting portion 14 is sulfonated to a depth of about twenty-five microns (25 $\mu$m) with the sulfamic acid and neutralized with ammonia, copper or other neutralizing agents. The ammonia molecules, by way of example, bind to the HDPE molecules and make the HDPE mounting portion 14 more resistant to hydrocarbons. Therefore, the surface of the sulfonated mounting portion 14 resists permeation by fuel vapor hydrocarbons. Moreover, the HDPE materials including the sulfonated HDPE may also be provided with a multi-layer permeation barrier 38, described in detail below, to further reduce fuel vapor permeation from the fuel tank T.

The apparatus 10 generally includes a cap member (alternatively, top portion) 12, the mounting portion (alternatively, weldring or port) 14, and a valve housing 16. By way of brief introduction, the apparatus 10 is assembled by sliding a clip 34 of the mounting portion 14 into the cap member 12 to engage a catch 20, which attaches the cap member 12 to the mounting portion 14. To connect the valve housing 16 to the cap member 12, a descending annular ring 32 of the cap member 12 is fitted with at least one ascending, complementary annular ring 48 of the valve housing 16. Once assembled, the apparatus 10 is attached to the fuel tank T by welding its weldfoot 40 to the tank T via a weld W.

The foregoing elements and assembly steps are described in greater detail below, but it is to be understood that the following descriptive examples of the invention are intended merely to provide an enabling disclosure and are not intended to limit the present invention to use only as shown in the Figures.

With more detailed reference to FIG. 1, the cap member 12 and the valve housing 16 are axially secured together by snap-fitting or ultrasonically welding the descending ring 32 of the cap member 12 with ascending rings 48 of the valve housing 16. The cap member 12 in this aspect of the invention is made from HDPE, nylon, POM (polyoxymethylene) (acetal plastic)), PEEK (polyetheretherketone), a co-extruded vapor barrier material and combinations of these materials. The valve housing 16, for example, is made of POM, nylon, PEEK, and like materials. To reduce fuel vapor permeation from the valve housing 16, the valve housing 16 includes a cavity 52 in which an o-ring, a gasket, a sealant, and similar sealing elements (generally, element 58) may be inserted prior to attaching the annular rings 32, 48 together.

The valve housing 16 in FIG. 1 holds a float 46 (shown in phantom) via a retainer 18. The retainer 18 is mounted by mounting tabs 62 to the valve housing 16 via slots 56 to retain the float 46 within the housing 16. The valve housing 16 is at least partially disposed inside of the fuel tank T and sized as required to control a fuel level (not shown) or to shut off fuel flow in the event of a vehicle rollover. The slots 56 in conjunction with openings 57a in the retainer 18 also permit fuel and fuel vapor to enter the valve housing 16 to act upon the float 46 and/or to allow fuel vapor to discharge through a nozzle 26.

The number, shape, and location of the slots 56 and openings 57a are not limited to the example of FIG. 1. For instance, the location of the slots 56 and tabs 62 can be reversed and additional slots or openings of varying sizes and shapes can be positioned as necessary to permit fuel and fuel vapor entry into the apparatus 10. An example of this operation is discussed in greater detail below.

Figure 2:
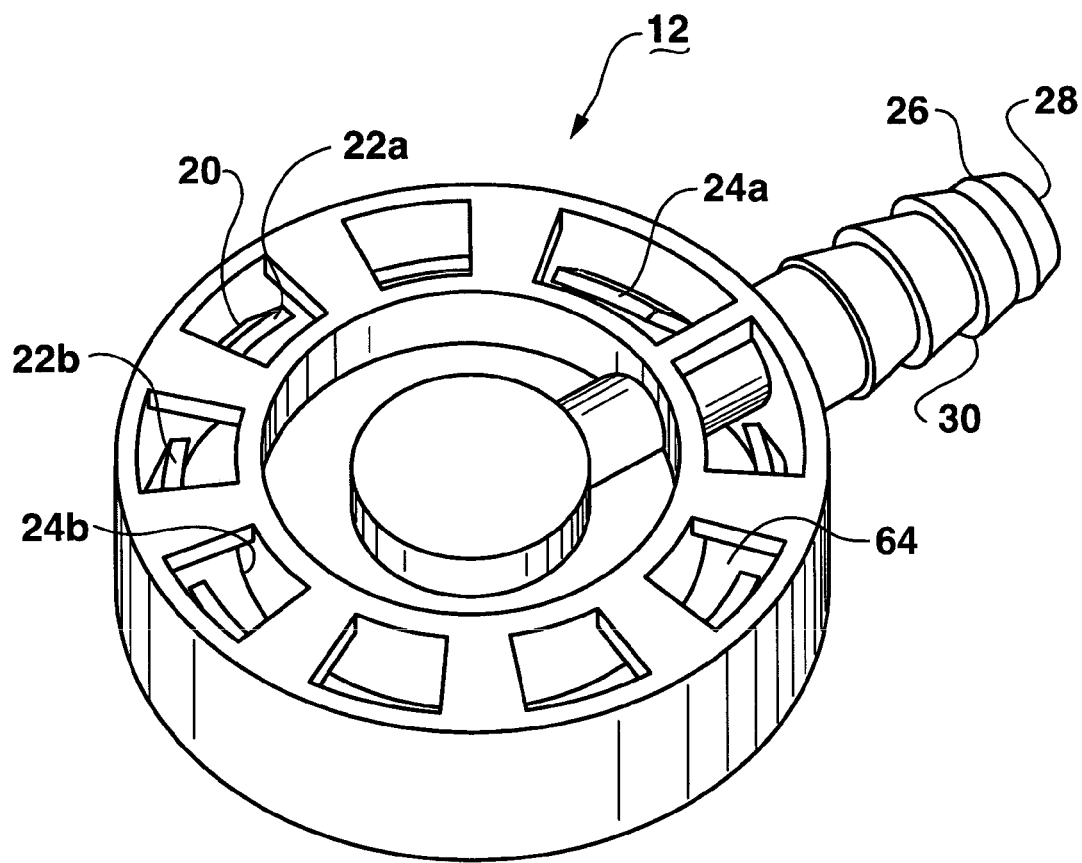
FIG. 2 is a top perspective view of a cap member of the assembly as in FIG. 1.
Figure 4:
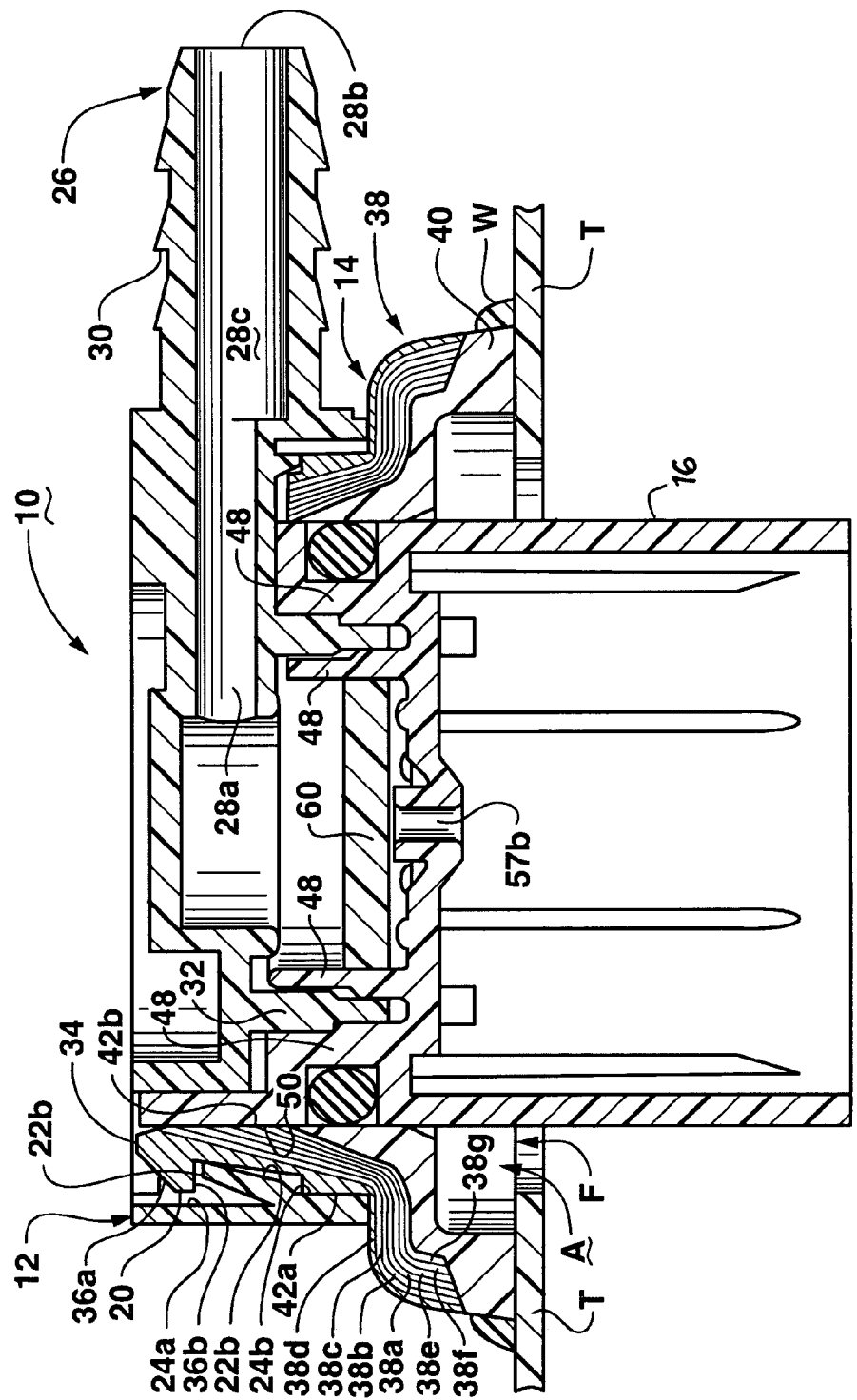
FIG. 4 is a sectional elevational view of the assembly as in FIG. 1, particularly showing a multi-layer permeation barrier in accordance with an aspect of the present invention.

With particular reference to FIGS. 1, 2 and 4, the exemplary cap member 12 is made of POM, and includes the catches 20 as briefly introduced above, the nozzle 26, and a plurality of apertures 64. The nozzle 26 includes an inlet 28a, an outlet 28b, a passageway 28c for connecting the inlet 28a with the outlet 28b, and a plurality of ridges 30 for gripping and holding an interior of a hose (not shown) for conducting fuel or fuel vapor from the interior of the fuel tank T to a collection device (not shown). Operation of nozzles and collection devices is not necessary to understand the present invention and is not further described.

Each of the catches 20 of the cap member 12 defines an engaging surface 22a and a contact surface 22b. Each catch 20 also depends inwardly from an inner surface 24a of the cap member 12 in a direction of the fuel tank aperture A. Although the catches 20 are shown depending from the inner surface 24a at about 30 degrees from a vertical plane, any angle from greater than about 0 degrees to about 90 degrees can be provided that permits the catch 20 to bypass the clip 34 in an axial direction and engage the clip 34 such that the cap member 12 is attached to the mounting portion 14. In this example, the catch 20 will flex relative to the inner surface 24a as the clip 34 is inserted. Once the catches 20 have engaged respective clips 34, the catches 20 will return to a resting position to hold the clips 34 in place as shown most clearly in FIG. 4.

With reference to FIG. 2, the plurality of apertures 64 in the cap member 12 is used to inspect a connection of the catches 20 and the clips 34. Additionally, the apertures 64 are used to access the clips 34 and release them from the catches 20, which in turn releases the cap member 12 from the mounting portion 14. Release of the clips 34 and therefore detachment of the cap member 12 from the mounting portion 14 may be desirable for maintenance of the apparatus 10. An example of this operation is described in greater detail below.

FIGS. 2 and 4 further show a retaining projection 24b defined on the cap member 12 that circumferentially overlaps an opposing surface 42a of the mounting portion 14 to align the cap member 12 and the mounting portion 14 and to prevent the cap member 12 and catches 20 from tilting way from the fuel tank T.

Figure 3:
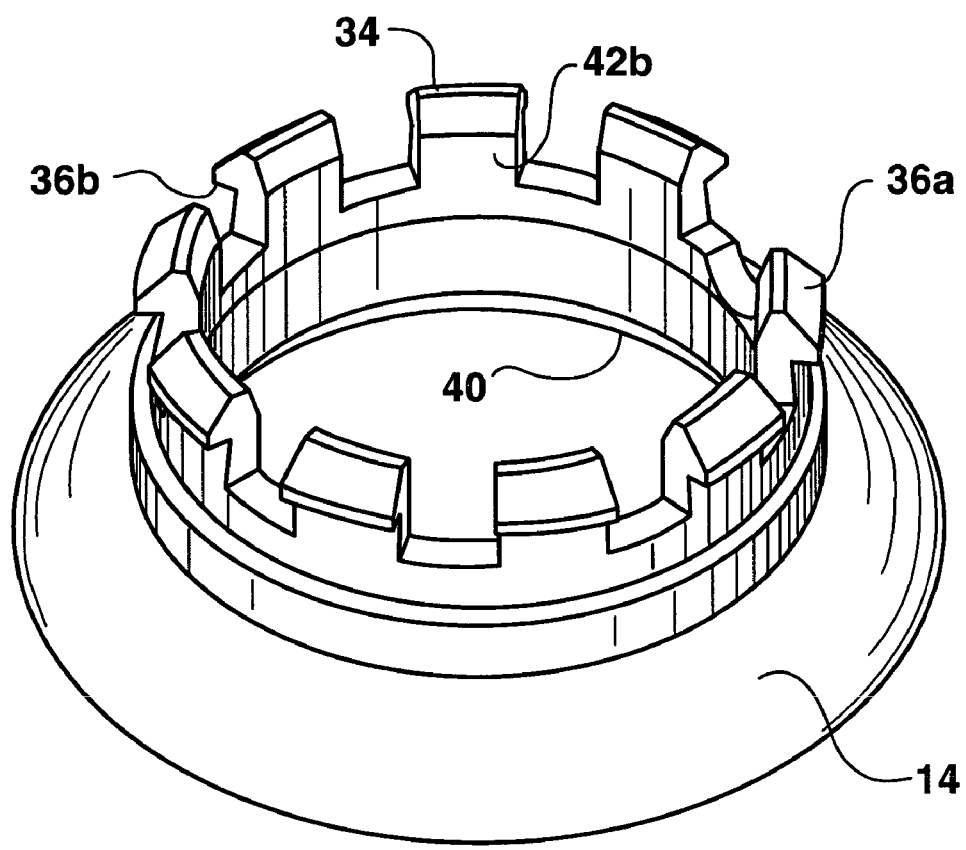
FIG. 3 is a top perspective view of a mounting portion of the assembly as in FIG. 1.

With reference to FIGS. 1, 3 and 4, the mounting portion 14 of the apparatus 10 is shown with the clips 34 and the weldfoot 40 as briefly introduced. Each of the clips 34 have a complementary engaging surface 36a and a complementary contact surface 36b, which respectively engage the engaging surface 22a and the contact surface 22b on each of the catches 20. The mounting portion 14 further defines an opposing surface 42b, which engages a complementary retaining projection 50 of the valve housing 16 to align and fix the mounting portion 14 and the valve housing 16 relative to each other.

FIG. 3 particularly shows the clips 34 depending in a direction away from the weldfoot 40. The clips 34 are spaced apart circumferentially from each other and radially apart from the valve housing 16 to snap-fit on the catches 20. In this example, the clips 34 are flexible relative to the weldfoot 40, which permits the clips 34 to flexibly move past the catches 20 as the clips 34 are inserted through the aperture 64 of the cap member 12. As noted above, the catches 20 can also be made flexible relative to the inner surface 24a of the cap member 12 in order to ease insertion of the clips 34. Once inserted, the clips 34 return to a resting position in order to hold the cap member 12 and the mounting portion 14 together as shown in FIG. 4. Once the catches 20 are engaged, the clips 34 require a force of at least about 2000 Newtons to axially separate the cap member 12 from the mounting portion 14.

With reference to FIGS. 1, 3 and 4, the weldfoot 40 of the mounting portion 14 is made, for example, of HDPE, and the fuel vapor laminate or barrier 38, briefly introduced above, is applied to the mounting portion 14 near the weldfoot 40 to act as a vapor penetration or permeation barrier against fuel vapor permeation from the fuel tank T.

As seen most clearly in FIG. 4, the barrier 38 has multiple layers including, for instance, an ethylene vinyl alcohol copolymer (EVOH) resin depicted here as inner layer 38a. EVOH is characterized by its gas barrier properties and its resistance to solvents, chemicals and the like, which is described further below. The barrier 38 also includes an adhesive layer 38b, a layer of HDPE 38c, an outer layer of conductive HDPE 38d, another adhesive layer 38e, another inner layer of HDPE 38f, and another outer layer of conductive HDPE 38g, which is extruded with or ultrasonically welded to the mounting portion 14.

The EVOH layer 38a in the present example is about 0.06 millimeters thick in accordance with tank manufacturing tolerances that require fuel tank valve assemblies to discharge no more than about 10 milligrams per day of fuel vapor hydrocarbons. The thickness of the layer 38a can vary, such as between about 0.001 millimeters to about 5 millimeters, to meet more or less stringent permeation requirements. EVOH resin is used in this example for layer 38a, but any resin or material with suitable gas barrier properties can be substituted for the layer 38a. The exemplary EVOH resin is available from a variety of sources such as under the brand name EVAL™ from EVAL Europe N.V. in Zwijndrecht, Belgium.

The layer 38a is co-extruded with a layer 38c of HDPE to protect the EVOH from external wear. A layer of adhesive 38b is also co-extruded and disposed between the layers 38a and 38c to adhere the HDPE and EVOH together since HDPE and EVOH are not chemically bonded. A suitable adhesive for use as adhesive 38b is available under the brand name ADMER™ GT6E resin from Mitsui Chemicals Europe GmbH of Duesseldorf, Germany. However, any comparable adhesive suitable for adhering layers 38a, 38c together can be used. Further, although the layers 38a–g are co-extruded, other processes such as laminations, baths, sprays, overmolding, and the like can be used to form the multi-layer barrier 38.

With continued reference to FIG. 4, the exemplary barrier 38 is shown angling away from the weldpoint W at about 45° on the mounting portion 14 proximate the weldfoot 40. The barrier 38 is spaced apart from the tank T to permit the weldfoot 40 to be welded to the tank T without interference from the barrier 38. Although the barrier 38 terminates at about a 45° angle near the weldpoint W in this example, the barrier 38 may have any termination angle, such as between about 90° to about 270° approximately parallel to the tank T. Alternatively, the barrier 38 can be angled in a substantially opposite direction away from the weldpoint W, such as to about 315° to about 350°. Moreover, the barrier 38 may not be curved at all but may be applied on a tank port with a different aspect angle; i.e., the tank port can have a straight edge substantially perpendicular to the tank T such that the barrier 38 would be flatly applied to the mounting portion 14 such that only the weldable portion of the barrier 38 is welded to the surface of the fuel tank T.

Although the barrier 38 is shown in FIG. 4 applied to substantially the entire mounting portion 14, the barrier 38 can be selectively applied to specific elements. For instance, an additional gas permeation barrier such as barrier 38 may be required on the nozzle 26 if the nozzle 26 is made of HDPE. Further, instead of or in addition to applying the barrier 38 on an external surface of the mounting portion 14 as depicted, the barrier 38 can be applied on an opposing or internal surface of the mounting portion 14 or elements thereof.

The foregoing embodiment may be best understood with reference to an exemplary method of assembly and operation as shown in FIGS. 1–4. The method includes the steps of: providing the valve housing 16 defining the first annular ring 48 thereon; providing the cap member 12 defining the second annular ring 32 thereon and a plurality of catches 20, the annular rings 32, 48 complementary to each other; providing the mounting portion 14 having the weldfoot 40 and a plurality of clips 34 depending from proximate the weldfoot 40; connecting the valve housing 16 and the cap member 12 together via the annular rings 32, 48 such as by an ultrasonic weld; and mating respective catches 20 and clips 34 to connect the cap member 12 and mounting portion 14 together.

As discussed above, the catches 20 each define an engaging surface 22*a* and may be flexible relative to the inner surface 24*a* of the cap member 12. The clips 34 each define a complementary engaging surface 36*a* and may be flexible relative to the weldfoot 40. Upon insertion of the clip 34 in the aperture 64 of the cap member 12, the complementary engaging surface 36*a* engages the engaging surface 22*a* of the catch 20. As the engaging surfaces 22*a*, 36*a* engage each other, one or both of the catch 20 and clip 34 temporarily flex to permit the complementary engaging surface 36*a* to move past the catch 20 in a direction away from the fuel tank T. Continued insertion of the clip 34 in the aperture 64 eventually causes the engaging surface 36*a* to bypass the catch 20 and one or both of the catch 20 and clip 34 return to resting positions as shown for example in FIG. 4.

The exemplary method of assembly also includes the step of inserting at least a portion of the valve housing 16 through the aperture A in the fuel tank wall T such that the valve housing 16 is in fuel-vapor communication with an interior of the fuel tank T. The weldfoot 40 is attached to the fuel tank wall T about the aperture A such as by welding at weldpoint W apart from the barrier 38.

By way of further example operation with reference to FIG. 1, the apparatus 10 is in an open condition, which permits fuel vapor from the fuel tank T to enter through the slots 56 and openings 57*a*, and continue through the opening 57*b* and the inlet 28 of the nozzle 26 into the passageway 26*c*. The fuel vapor then continues via the outlet 28*b* of the nozzle 26 to a fuel vapor recovery device (not shown), for example, to evacuate fuel vapor from the inside of the fuel tank T.

When an operator (not shown) fills the tank T with fuel, the rising fuel enters the slots 56 and openings 57*a* contacts the float 46. In this aspect of the invention, the float 46 is heavier than the fuel; therefore, a spring (not shown) can be inserted in float 46 to urge the float 46 in a direction of the opening 57*b*. The combination of the rising fuel and a spring constant of the spring eventually overcomes a preset weight of the float 46 and urges the float 46 into an engagement with or about the opening 57*b*. When the float 46 is buoyed against the opening 57*b*, the apparatus 10 is closed. It should also be noted that the float 46 could close the opening 57*b* when the fuel tank T is inclined beyond a preset inclination level greater than, for example 60°. Such an inclination angle might occur if the vehicle rolls over or is on a grade or hill. In these cases, the inclination angle would cause the fuel to contact float 46 and drive the float 46 in the direction of the opening 57*b* as described.

Figure 5:
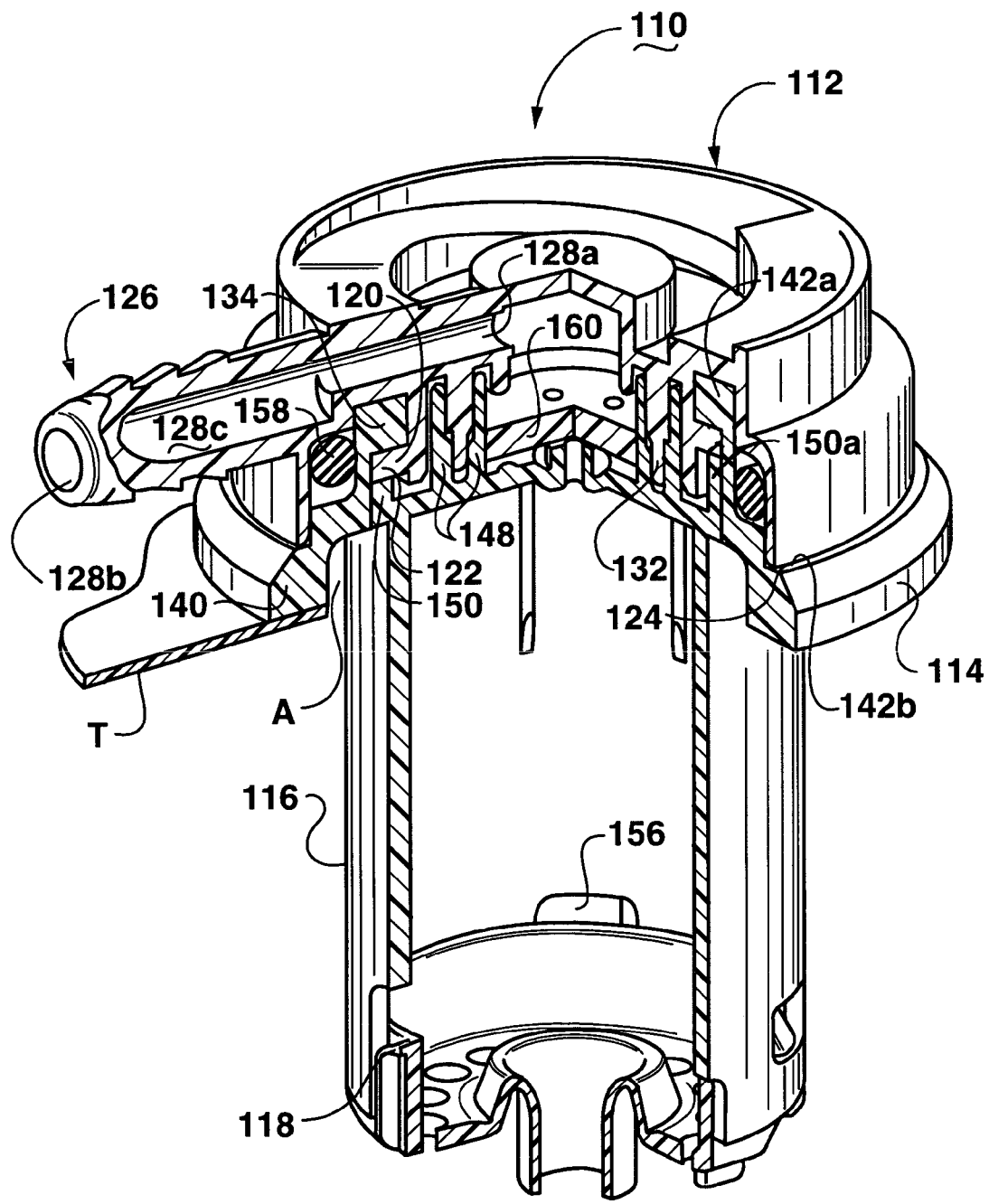
FIG. 5 is a top perspective, sectional view of an assembly in accordance with another aspect of the present invention.
Figure 6:
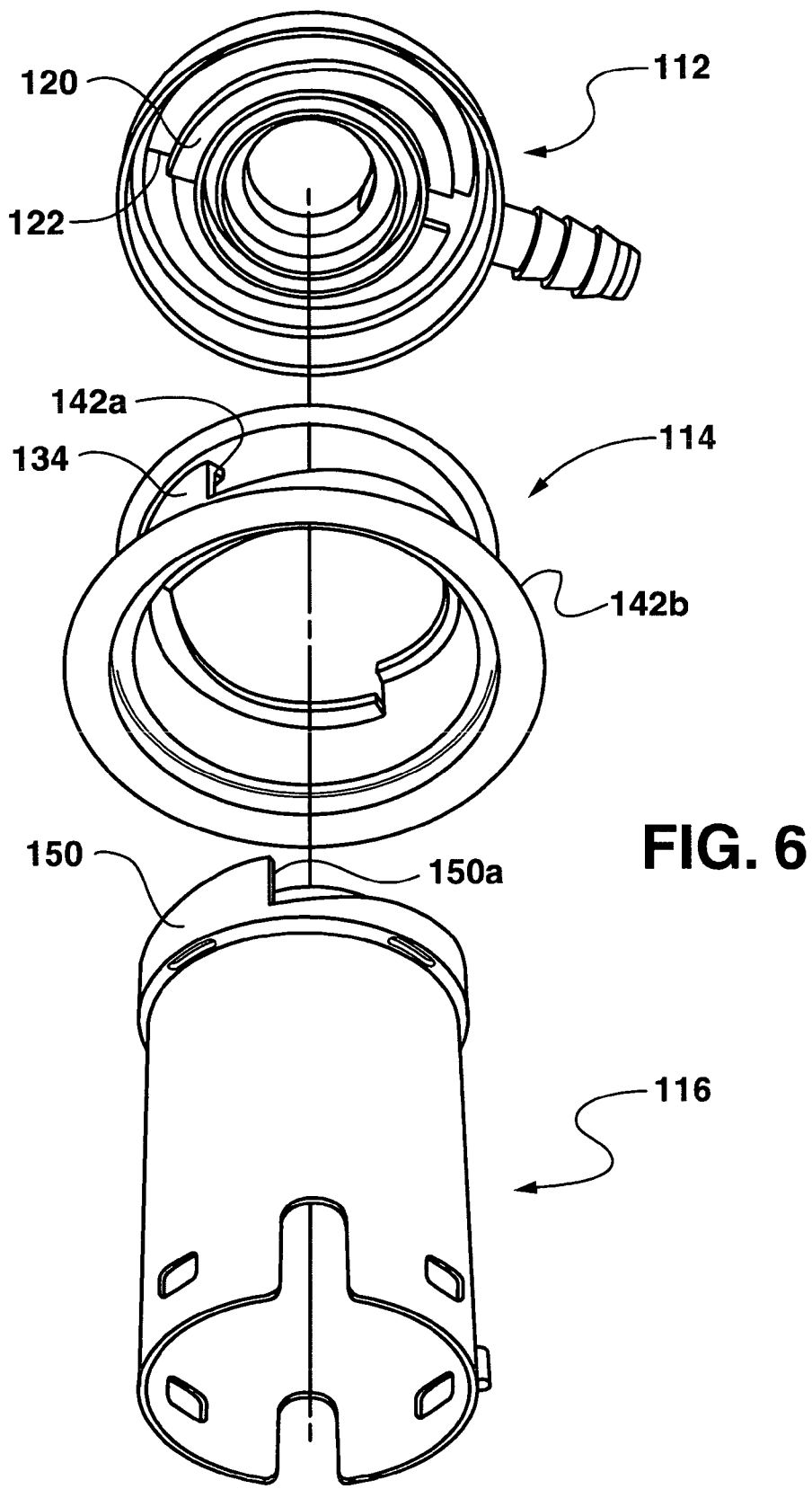
FIG. 6 is an exploded view of the assembly as in FIG. 5 showing a step in a method of assembling the assembly in accordance with another aspect of the present invention.

In an alternative embodiment of the invention as shown in FIGS. 5 and 6, a weldable fuel system apparatus 110 is attached to a fuel tank T such as by ultrasonic welding. In this aspect of the invention, the apparatus 110 generally includes a cap member 112, a mounting portion 114, and a valve housing 116. This embodiment is in some ways similar to the foregoing embodiment; therefore, for brevity, only certain pertinent differences are discussed below and reference is made to the previous embodiment for descriptions of like elements and operation. For instance, a multi-layer permeation barrier, such as barrier 38 described above, is not shown in FIGS. 5 and 6 for clarity but is applicable to the present embodiment. Accordingly, the description of barrier 38 is incorporated by reference in this embodiment.

With particular reference to FIG. 5, the cap member 112 defines a first helical thread 120 that attaches the cap member 112 to a second helical thread 134 of the mounting portion 114 by either a clockwise or counterclockwise threading action. Similarly, a third helical thread 150 of the housing 116 is screwed onto the mounting portion 114. Once assembled, the apparatus 110 is attached to the fuel tank T in a manner similar to the previous embodiment.

As shown in FIG. 5, the cap member 112 defines at least one engaging surface 122 on its first helical thread 120 and a circumferential contact surface 124 disposed about a lower portion of the cap member 112. The engaging surface 122 is substantially parallel to and disposed in a substantially vertical plane. An example operation of these elements is described below.

The mounting portion 114 in FIG. 5 defines at least one opposing surface 142*a* on its second helical thread 134 and an opposing surface 142*b*. Similar to the engaging surface 122 of the cap member 112, the opposing surface 142*a* of the mounting portion 114 is substantially parallel to and disposed in the substantially vertical plane. The first helical thread 120 and the second helical thread 134 are complementary to each other such that once the cap member 112 and the mounting portion 114 are threaded together, the engaging surface 122 and the opposing surface 142*a* are substantially parallel and concentric to each other in the substantially vertical plane. Moreover, the contact surface 124 of the cap member 112 engages the opposing surface 142*b* to stop rotation of the cap member 112 relative to the mounting portion 114.

The housing 116 shown in FIG. 5 defines at least one engaging surface 150*a* on its third helical thread 150. The engaging surface 150*a* is disposed in the vertical plane substantially parallel to that of the engaging surface 122 and the opposing surface 142*a*. However, in this aspect, the third helical thread 150 is counter-formed relative to the first helical thread 120 and the second helical thread 134. Thus, after a predetermined number of component rotations the engaging surface 122 and the opposing surface 142*a* eventually abut the engaging surface 150*a* to prevent continued rotation of the housing 116 relative to the rest of the apparatus 110. The number of component rotations required to halt continued rotation is a function of the number of helical threads 120, 134, and 150, which are variable according to manufacturing requirements.

The foregoing embodiment may be better understood with reference to an exemplary method for attaching the valve assembly to the fuel tank T as shown in FIG. 6. The method includes the steps of: providing the valve housing 116 defining the third helical thread 150 thereon; providing the cap member 112 defining the first helical thread 120 thereon, the two helical threads 120, 150 complementary to each other to mate the cap member 112 to the valve housing 116; providing the mounting portion 114 having a weldfoot 140 and the second helical thread 134 thereon depending from proximate the weldfoot 140; rotatably attaching the cap member 112 to the mounting portion 114 via the helical threads 120, 134; mating the valve housing 116 to the attached cap member 112 and mounting portion 114 via the helical threads 120, 134, 150; inserting at least a portion of the valve housing 116 through the aperture A in the fuel tank wall T such that the valve housing 116 is in fuel vapor communication with an interior of the fuel tank T; and attaching the weldfoot 140 to the fuel tank T about the aperture A.

The method may also include the step of fixing the valve housing 116 to the attached mounting portion 114 and cap member 112 by welding, heat staking, bonding and the like.

The bonding step can utilize any suitable adhesive.

Another step in the method may include inserting a seal 158 such as an o-ring, an adhesive, a sealant and the like between one of the valve housing 116, the cap member 112, the mounting portion 114 or combinations of these.

Although the invention has been described in such a way as to provide an enabling disclosure for one skilled in the art to make and use the invention, it should be understood that the descriptive examples of the invention are not intended to limit the present invention to use only as shown in the Figures. For instance, threaded directions of the helical threads 120, 134, and 150 and their respective surfaces 122, 142a, and 150a can be reversed and/or arranged in a different concentric order; e.g., the o-ring 158 can be inserted between the mounting portion 114 and the valve housing 116 instead of between the cap member 112 and the mounting portion 114 as shown in FIG. 5.

It is also to be understood that references herein to "top," "lower," "bottom," "descending," "ascending," and "side" structures or elements are intended solely for purposes of providing an enabling disclosure and in no way suggest limitations regarding the operative orientation of the exemplary embodiments or any components thereof. Thus, while exemplary embodiments of the invention have been shown and described, those skilled in the art will recognize that changes and modifications may be made to the foregoing examples without departing from the scope and spirit of the invention. For instance, specific shapes of various elements of the illustrated embodiments may be altered to suit particular applications. It is intended to claim all such changes and modifications as fall within the scope of the appended claims and their equivalents.

What is claimed is:

1. An apparatus for attachment in an aperture of a fuel tank, the apparatus comprising:
   a cap member having a vapor-inlet opening, a vapor-outlet opening, and a passageway interconnecting the vapor-inlet opening and the vapor-outlet opening;
   a mounting portion defining a weldfoot configured for welding to the fuel tank, wherein the mounting portion includes a laminate having multiple layers including a weldable layer, the laminate configured to block a permeation of fuel from about a surface of the fuel tank proximate the mounting portion, the laminate being disposed at least within the weldfoot and configured such that only the weldable layer is welded to the surface of the fuel tank;
   means for connecting the cap member and the mounting portion together; and
   a valve housing attachable to the cap member, the valve housing at least partially disposed within an interior of the fuel tank, the valve housing configured for fuel-vapor communication with the interior of the fuel tank and the vapor-inlet opening of the cap member.

2. An apparatus for mounting a valve assembly in an aperture of a fuel tank, the apparatus comprising;
   a cap member having a first helical thread defined thereon and a nozzle, the nozzle defining a vapor-inlet opening, a vapor-outlet opening and a passageway therein;
   a mounting portion defining a weldfoot and a second helical thread defined thereon, the weldfoot having a multilayer laminate configured to reduce a fuel-vapor permeation from the fuel tank, the weldfoot configured for welding to a surface of the fuel tank, the second helical thread configured for attachment with the first helical thread to attach the cap member and the mounting portion together; and
   a valve housing attachable to the cap member and at least partially disposed within an interior of the fuel tank, the valve housing configured for fuel-vapor communication with the interior of the fuel tank and the vapor-inlet opening of the cap member.

3. The apparatus as in claim 2, wherein the first helical thread defines an engaging surface disposed in a substantially vertical plane.

4. The apparatus as in claim 2, wherein the cap member is made from a material selected from the group consisting of HDPE, nylon, POM, PEEK, and combinations thereof.

5. The apparatus as in claim 2, wherein the multilayer laminate has a weldable layer, the multilayer laminate being disposed at least within the weldfoot and configured such that only the weldable layer is welded to the surface of the fuel tank.

6. The apparatus as in claim 2, wherein the cap member defines a contact surface disposed apart from the surface of the fuel tank and the mounting portion has an opposing surface, the contact surface and the opposing surface configured to halt rotation of the first and second helical threads to attach the cap member and the mounting portion together.

7. The apparatus as in claim 2, wherein the valve housing has a third helical thread defined thereon, the third helical thread further defining an engaging surface disposed in another substantially vertical plane substantially parallel to the vertical plane of the engaging surface of the first helical thread, the engaging surface of the third helical thread configured to abut an engaging surface of the second helical thread, the engaging surface of the second helical thread disposed substantially in a third vertical plane substantially parallel to the second vertical plane.

8. The apparatus as in claim 2, further including one of an o-ring, a gasket, a sealant and combinations thereof disposed between one of the cap member, the mounting portion, the valve housing and combinations thereof.

9. An apparatus for mounting a valve assembly in an aperture of a fuel tank, the apparatus comprising:
   a cap member having a holding piece, a vapor inlet opening, a vapor outlet opening, and a passageway interconnecting the vapor inlet opening and the vapor outlet opening;
   a mounting portion defining a weldfoot and a projection piece to be held by the holding piece, the weldfoot configured for welding to the fuel tank, the holding piece and the projection piece cooperable to attach the cap member to the mounting portion; and
   a valve housing attachable to the cap member, the valve housing at least partially disposed within an interior of the fuel tank, the valve housing configured for fuel vapor communication with the interior of the fuel tank and the vapor inlet opening of the cap member, wherein vertical cross sections of each of the valve housing, the mounting portion, and the member define a helical structure.

10. The apparatus as in claim 9, wherein the projection piece is a helical thread.

11. The apparatus as in claim 9, wherein the holding piece of the cap member is a complementary helical thread, the holding piece configured for removably capturing the projection piece of the mounting portion.

12. The apparatus as in claim 9, wherein the mounting portion includes a laminate having multiple layers including a weldable layer, the laminate configured to block a permeation of fuel from about a surface of the fuel tank proximate the mounting portion, the laminate being disposed at least within the weldfoot and configured such that only the weldable layer is welded to the surface of the fuel tank.

* * * * *